US012280523B2

(12) United States Patent
Tongiani

(10) Patent No.: US 12,280,523 B2
(45) Date of Patent: Apr. 22, 2025

(54) SYSTEM AND METHOD FOR MOVING A BLOCK OF STONE MATERIAL

(71) Applicant: SFERA S.R.L., Massa (IT)

(72) Inventor: Stefano Tongiani, Massa (IT)

(73) Assignee: SFERA S.R.L., Massa (IT)

( * ) Notice: Subject to any disclaimer, the term of this patent is extended or adjusted under 35 U.S.C. 154(b) by 927 days.

(21) Appl. No.: 17/264,708

(22) PCT Filed: Jul. 31, 2019

(86) PCT No.: PCT/IT2019/050178

§ 371 (c)(1),
(2) Date: Jan. 29, 2021

(87) PCT Pub. No.: WO2020/026285

PCT Pub. Date: Feb. 6, 2020

(65) Prior Publication Data

US 2021/0299911 A1 Sep. 30, 2021

(30) Foreign Application Priority Data

Jul. 31, 2018 (IT) ........................ 102018000007654

(51) Int. Cl.
*B28D 7/04* (2006.01)

(52) U.S. Cl.
CPC ...................................... *B28D 7/04* (2013.01)

(58) Field of Classification Search
CPC . B28D 7/04; B28D 1/005; B28D 1/00; B28D 1/121; B28D 1/02; B25G 35/02; B25G 35/00
USPC ............................................................ 125/35
See application file for complete search history.

(56) References Cited

FOREIGN PATENT DOCUMENTS

| | | |
|---|---|---|
| CN | 101282829 A | 10/2008 |
| CN | 102530503 B | 7/2012 |
| CN | 203110168 U | 8/2013 |
| CN | 204036669 U | 12/2014 |
| CN | 204264888 U | 4/2015 |
| CN | 105291276 A | 2/2016 |
| CN | 105583463 A | 5/2016 |
| CN | 205418913 U | 8/2016 |
| CN | 205704766 U | 11/2016 |
| CN | 106363821 A | 2/2017 |
| CN | 206123970 U | 4/2017 |

(Continued)

OTHER PUBLICATIONS

International Search Report and Written Opinion of the International Searching Authority for International Application No. PCT/IT2019/050178, mailed on Nov. 4, 2019, in 13 pages.

(Continued)

*Primary Examiner* — Katina N. Henson
(74) *Attorney, Agent, or Firm* — Knobbe, Martens, Olson & Bear, LLP

(57) ABSTRACT

Described is a system and a method for moving a block of stone material, wherein the system comprises at least two devices comprising: a translation unit onfigured for translating a base of the block in a translation plane and a lifting unit configured for moving a base of the block in a direction substantially vertical to the translation plane; actuator means configured for allowing an independent actuation of the translation unit and of the lifting unit, the overall configuration of the movement device being such as to allow a progressive translation on the translation plane of the block of stone material with respect to a reference plane.

14 Claims, 3 Drawing Sheets

(56) References Cited

FOREIGN PATENT DOCUMENTS

| | | | |
|---|---|---|---|
| EP | 0022034 | A1 | 1/1981 |
| FR | 2683177 | A1 | 5/1993 |
| JP | 7-52147 | A | 2/1995 |

OTHER PUBLICATIONS

Search Report and Written Opinion for Italian Application No. 102018000007654, mailed on Apr. 26, 2019, in 11 pages.

SYSTEM AND METHOD FOR MOVING A BLOCK OF STONE MATERIAL

CROSS-REFERENCE TO RELATED APPLICATIONS

This application is the U.S. National Phase under 35 U.S.C. § 371 of International Application PCT/IT2019/050178, filed Jul. 31, 2019, which claims priority to IT application No. 102018000007654, filed Jul. 31, 2018, the entire contents of each of which are incorporated by reference herein and made a part of this specification.

BACKGROUND

Field

This invention relates to a system and a method for moving a block of stone material, in particular for moving a block of marble to allow cutting operations, for example for obtaining one or more slabs of marble from the block.

The invention therefore relates to the field of machines for machining blocks of stone extracted from quarries to obtain slabs or semi-finished items made of stone material.

Description of the Related Art

A block of marble, with a substantially cubic shape, can weigh approximately 40-80 tons. For this reason, the movement of the block is usually carried out by means of cable slings and cranes for the lifting and translation and/or rotation of the block.

A drawback of the prior art operational methods is that the movement of a block with large dimensions by means of a crane does not guarantee the precision which is required, in particular on reduced movements necessary for mechanical machining operations.

For example, when cutting slabs, the cut is executed by cutting the block, generally from the top downwards, along the entire thickness of the block.

The machines for cutting stone materials are fixed and the cutting operation is repeated in succession for each slab positioning the block at the cutting machine.

A variation in the orientation of the block between two cuts in sequence caused defects to the slab obtained, at least defects due to a non-uniform thickness of the slab.

In the case of a non-uniform thickness, grinding operations are necessary, with a consequent increase in the machining costs and of the waste material.

SUMMARY

For this reason, the technical problem raised and resolved by the invention is that of providing a device and a system for moving a block of stone material which allows the above-mentioned drawbacks of the prior art to be overcome.

This problem is overcome by a system according to the independent claims herein.

Preferred features of the invention are present in the respective dependent claims.

The invention provides some significant advantages.

In particular, the system according to the invention allows a movement of the block to be controlled, for example a translation towards the cutting machine, as well as a possible rotation of the block itself, for realigning the cutting surface with the cutting plane, by means of at least two movement devices positioned or which can be positioned, substantially parallel to each other, at base edges of the block of marble, in such a way as to prevent undesired unbalancing of the block during the movement of the block itself, thereby eliminating possible accidents inside the machining department, it being possible to actuate said movement devices one at a time or simultaneously, in the latter case simultaneously in the same direction or simultaneously in opposite directions.

For this reason, a considerable reduction in the risks of error in the precision mechanical machining is obtained, in particular in the operations for cutting the marble block into slabs.

A further advantage of the invention is the compactness of the components of the system, which allows a versatility in the positioning to support of the block of stone material.

Other advantages, the features and the means of use of the invention will become clear from the following detailed description of some embodiments, provided by way of example and without limiting the scope of the invention.

BRIEF DESCRIPTION OF THE DRAWINGS

Reference is made to the accompanying drawings, in which.

The similar parts will be indicated in the various drawings with the same numerical references.

DETAILED DESCRIPTION

Figure 1:
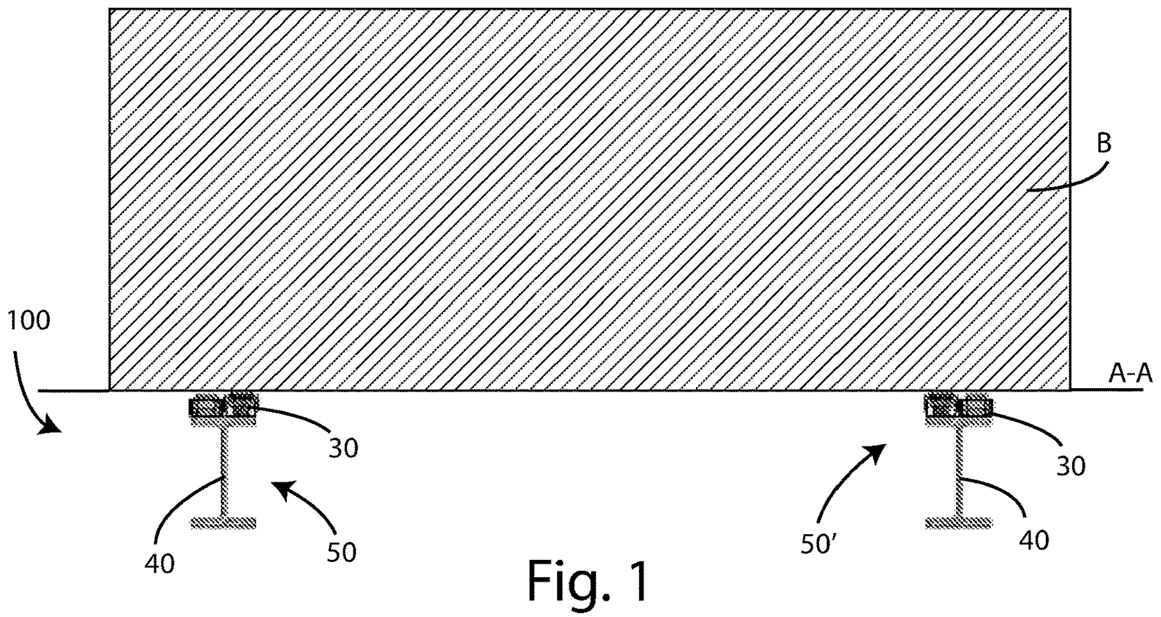
FIG. 1 shows a schematic cross sectional view of a first embodiment of the system for movement of a block of stone material according to the invention.

With reference to FIG. 1, a system for moving a block B of stone material according to the invention is labelled 100 and comprises at least one pair of movement devices, as described below.

According to a first embodiment of the invention, as shown in FIGS. 2 to 7, each movement device is labelled 50.

Figure 2:
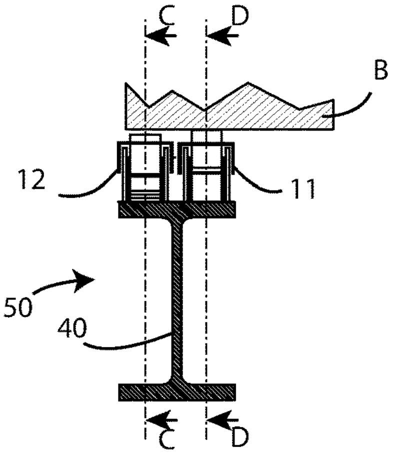
FIG. 2 shows a transversal cross sectional view of a first operational configuration of a first embodiment of a movement device of the system for movement of a block of stone material according to the invention.

As show in FIGS. 1 and 2, each movement device 50 comprises a frame 40 shaped to support a base portion of the block of stone material and means 30 for moving the block, preferably at least partly fixed to the frame 40, as described in more detail below. In particular, the frame is shaped like a linear beam, for example a T beam.

The means 30 for moving the block are shaped for being positioned or which can be positioned between the frame 40 and the block B of stone material and comprise at least one translation unit 11 and at least one lifting unit 12 of the block B of stone material, wherein each of said units has an upper supporting surface shaped to support the base of the block B of stone material.

The translation unit 11 is configured for moving a portion of the base of the block B of stone material in a translation plane A-A, preferably horizontal and/or parallel to the ground.

Figure 5:
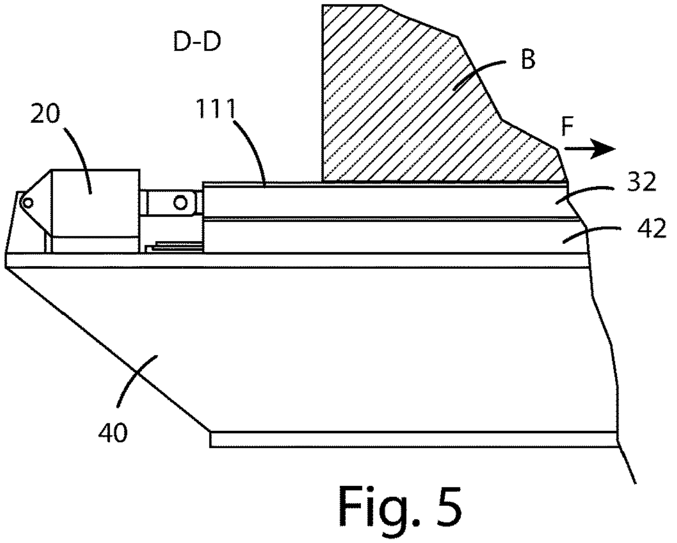
FIG. 5 shows a lateral cross sectional view of a further detail of FIG. 2.

As shown in FIG. 5, the translation unit 11 includes a linear guide comprising a slidable slide 32 mounted on a sliding guide 42 fixed to the frame 40. The slide 32 has a supporting surface 111, preferably substantially coplanar with the translation plane A-A, configured for supporting a portion of the base of the block B of stone material.

Figure 3:
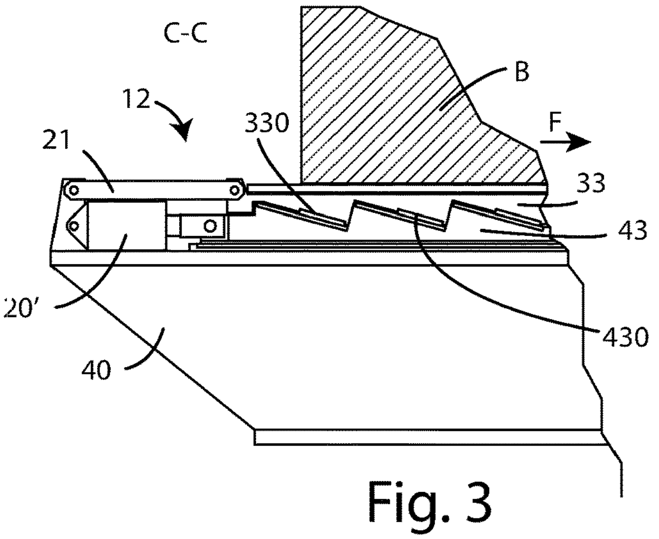
FIG. 3 shows a lateral cross sectional view of a detail of FIG. 2.
Figure 8:
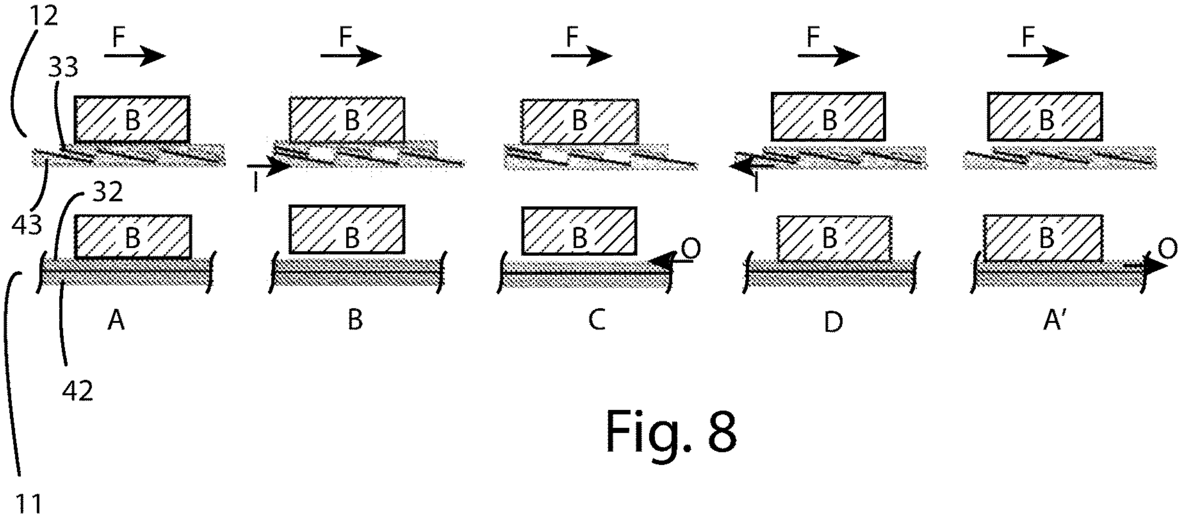
FIG. 8 shows a schematic diagram of the steps of an operational cycle of the movement system according to the first embodiment of the invention.
Figure 9:
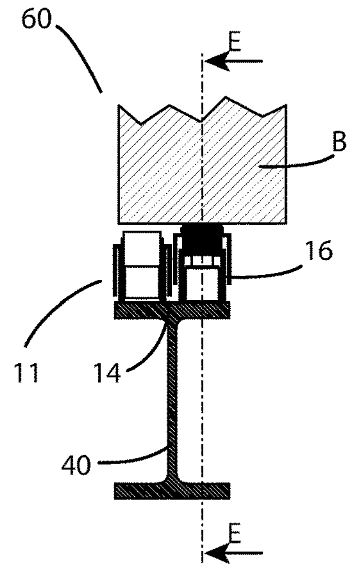
FIG. 9 shows a transversal cross sectional view of a first operational configuration of a second embodiment of a movement device of the system for movement of a block of stone material according to the invention.

Advantageously, the block of stone material is translated on the plane A-A to allow a forward movement towards a cutting machine. In particular, the block is translated along a main direction F, as indicated in FIGS. 3, 5 and 8.

The movement of the block of marble is divided into steps, in such a way as to feed the block with respect to an end edge of the frame 40 by a distance equal, for example, to the thickness of a slab, for each step.

The lifting unit 12 is configured for moving a base of the block B of stone material along a direction substantially perpendicular to the translation plane A-A.

Advantageously, the block B of stone material is moved in a direction perpendicular to the translation plane A-A in such a way as to lift it from the supporting surface 111 of the translation unit 11.

Further, the block B of stone material can be moved in such a way as to rotate on the translation plane A-A so as to correct any misalignments of the cut surface with respect to the cutting machine.

According to the first embodiment described, the lifting unit 12 comprises a rail 33, preferably fixed to the frame, mounted on a slidable slide 43, slidable coupled with the frame 40. The rail 33 has a supporting surface 112 configured for supporting a base portion of the block B.

Advantageously, the slide 43 is shaped in such a way as to have a sliding surface 430 wherein at least a sliding portion is inclined with respect to the translation plane A-A, shaped, for example, like a wedge.

In particular, the sliding surface 430 of the slidable slide 43 coupled to the rain 33 is shaped like a wedge, o or a step. For example, as shown in FIG. 3, it has a plurality of inclined steps.

The inclination of the inclined sliding portion, with respect to the translation plane A-A, is preferably between 10 and 30 degrees.

As shown in the drawings, a sliding surface 330 of the rail 33 is shaped in such a way that it can be coupled with a shape coupling to the sliding surface 430 of the slide 43.

Figure 10:
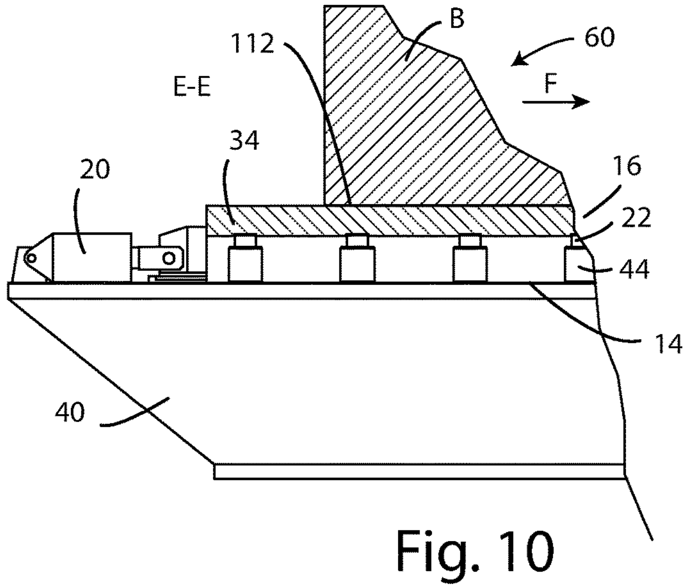
FIG. 10 shows a lateral cross sectional view of a detail of FIG. 9.
Figure 11:
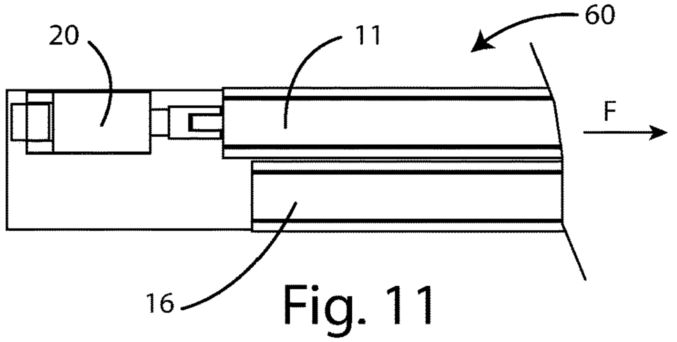
FIG. 11 shows a view from above of the device of FIG. 9.
Figure 12:
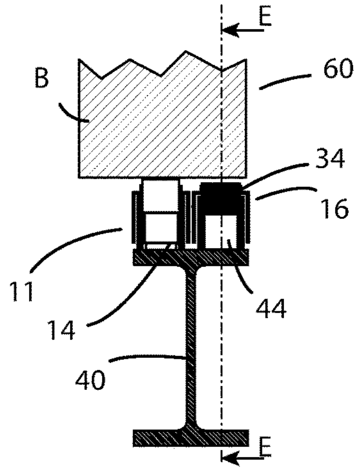
FIG. 12 shows a transversal cross sectional view of a second operational configuration of the second embodiment of the movement device of the system for movement of a block of stone material according to the invention.
Figure 13:
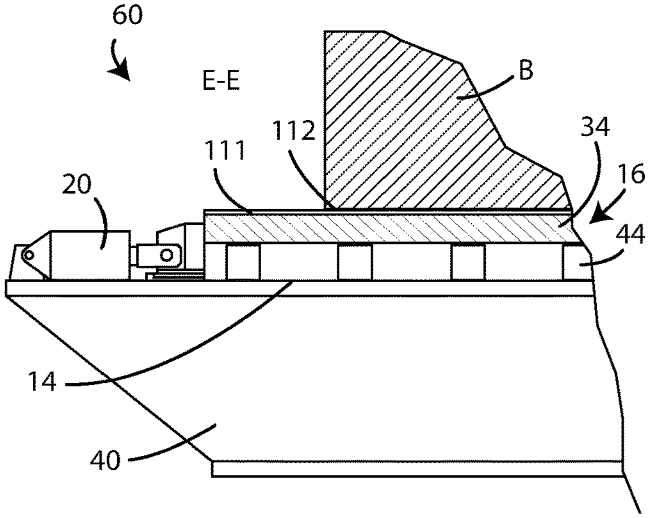
FIG. 13 shows a lateral cross sectional view of a detail of FIG. 12.

As shown in FIGS. 10 and 13, according to a second embodiment of the system according to the invention, in the movement device 60, the lifting unit 16 comprises at least two spacer elements 44, preferably positioned or which can be positioned between the spacers with respect to a central zone of the base of the block B.

The spacer elements 44 are preferably fixed to the frame 40 and are configured for spacing the block B from the frame 40.

According to a preferred configuration, the lifting unit 16 of the device 60 comprises a plurality of spacer elements 44, configured as cylindrical elements, as described in more detail below.

Optionally, there can also be a supporting rail 34, preferably shaped like a beam, interposed between an upper surface of the cylinders 44 and the base of the block B.

Advantageously, the supporting rail 34 allows the structural stability of the base of the block to be rendered uniform, for example if the stone material has a base surface which is not compact or which has grains.

For this reason, the supporting rail 34 has a supporting surface 112 shaped to support the block B of stone material.

As described in more detail below, the supporting surface 112 of the lifting unit 12, 16, in an operating condition of the movement device 50, 60 can lie above or below the translation plane A-A defined in particular by the plane on which the surface 111 lies.

Preferably, in a rest configuration of the movement means 30, the supporting surfaces 111 and 112 are coplanar so as to maximise the supporting surfaces for the block B of stone material.

Advantageously, the device according to the invention comprises actuator means 20, 20' and 22 configured for actuating the above-mentioned movement means 30 and in particular allow an actuation, preferably independent, of the above-mentioned translation unit 11 and lifting unit 12.

A shown in FIGS. 3 to 5 and 10 to 13, the actuator means comprise at least one linear actuator 20, 20' or 22, for actuating the lifting unit 12, 16 and/or the translation unit 11 in direction F.

In particular, the first embodiment comprises a linear motor, or an electric gear motor, or preferably a hydraulic or pneumatic cylinder 20, 20'. The translation 11 and lifting 12 units can also have dedicated actuator means of different types.

As shown in FIG. 5, a first hydraulic cylinder 20 is connected to the translation unit 11, in particular it is connected at an end of the slide 32, and it is configured in such a way as to actuate a sliding of the slide 32 with respect to the rail 42 in a direction substantially parallel to the plane A-A, in particular indicated with F in the drawings.

The upper portion of the slide 32 has a supporting surface 111 for the base of the block B, so, with a sliding of the slide 32, the block B of stone material is also translated in direction F, by a predetermined value.

A further linear actuator, for example a further hydraulic cylinder 20', is connected to the lifting unit 12, in particular it is connected at an end of the slide 43, and it is configured in such a way as to actuate a sliding of the slide 43, with respect to the supporting surface 14 of the frame 40, in a direction substantially parallel to the plane A-A, for example in the direction indicated with F in the drawings or in the opposite direction.

Figure 4:
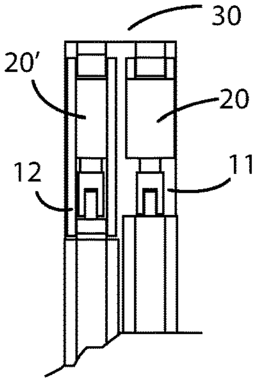
FIG. 4 shows a view from above of the device of FIG. 2.

In particular, the linear actuators describe above have a different size. For example, as shown in FIG. 4, the hydraulic cylinder 20' configured to actuate the lifting unit has dimensions greater than the cylinder 20 configured for actuating the translation unit, due to the different forces to be applied.

Preferably, the rail 33 is fixed to the frame 40, for example by means of an oblong element 21 acting as a connecting rod.

The oblong element 21 is hinged at each end, respectively, to the frame 40 and to the guide 33, in such a way as to fix the rail 33 with respect to the translation movements in direction F and preferably with respect to translation movements in a plane parallel to plane A-A.

Figure 7:
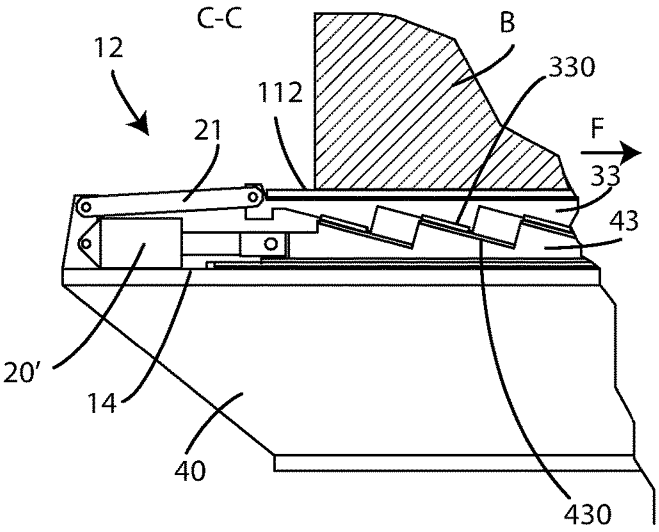
FIG. 7 shows a lateral cross sectional view of a detail of FIG. 6.

For this reason, with a translation indicated by the letter F of the slide 43, as shown in FIG. 7, the rail 33 is lifted in a substantially vertical direction.

The extent of the lifting depends on the inclination of the sliding surfaces.

Figure 6:
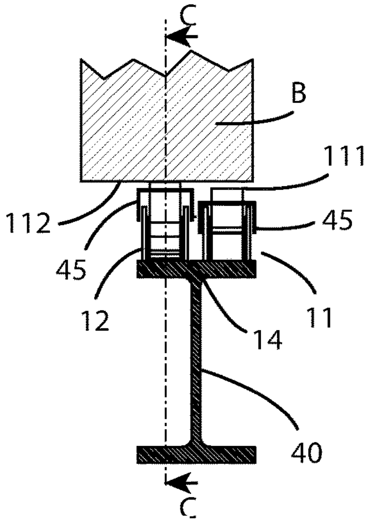
FIG. 6 shows a transversal cross sectional view of a second operational configuration of the first embodiment of a movement device of the system for movement of a block of stone material according to the invention.

Advantageously, as described in more detail below, the supporting surface 112 of the lifting unit 12 is therefore raised with respect to the supporting surface 111 of the translation unit 11. In this way, the block of marble B, as shown in FIG. 6, is supported only by the supporting surface 112 of the lifting unit 12 and the supporting surface 111 of the translation unit 11 can be freely moved.

Advantageously, the presence of the oblong element 21, results in a substantially uniform lifting of the marble block B.

In particular, as described in more detail below, the hydraulic cylinders 20, 20' are actuated alternately.

According to the second embodiment of the system 100 for moving a block of stone material according to the invention, the device 60 comprises a linear actuator, preferably a hydraulic or pneumatic cylinder 20, for actuating the translation unit 11, as described above with reference to the first embodiment.

Yet a further linear actuator 22 is provided at the above-mentioned spacer elements 44.

Preferably, at each spacer element there is a linear actuator, for example a hydraulic or pneumatic cylinder 22, configured for moving the block B of stone material, or the rail 34 in the preferred configuration, in a direction substantially perpendicular to the translation plane A-A.

Preferably, a plurality of hydraulic cylinders 22 are positioned beneath the base of the block B of stone material. In particular, unless there are specific structural needs which require a specific dimensioning of the spacer element, the same body of an outer liner of a hydraulic or pneumatic cylinder can act as spacer element 44.

The linear actuators 22 are connected together hydraulically, or pneumatically, in such a way as to work at a constant pressure.

Alternatively, the above-mentioned actuators 22 are independent from each other, each characterised by a specific pressure value, and actuated in such a way as to have a substantially equal vertical extension.

In the first case, in the case of a hydraulic or pneumatic connection between the actuators, the device 60 is less expensive and can be more easily controlled.

However, the uniformity of the movements upwards of the block of marble depends considerably on the physical and structural uniformity of the block itself.

In fact, with the same thrust pressure, the side of the block which is lightest and furthest from the barycentre will raise first.

However, advantageously, at the end of the lifting, all the cylinders 22 will be positioned at the end of their stroke, and the block B will return substantially parallel to a reference plane A-A.

In the second case, the independent control of the different actuators 22 allows a more uniform movement upwards of the base of the block B to be obtained.

In order to reduce the friction forces developed between the sliding surfaces, for example at a sliding interface between the slide and the rail, anti-friction elements are interposed, for example a foil of graphite coated bronze or Teflon with or without an oil bath.

In addition, the device according to the invention comprises sealing means and/or casings 45 configured for allowing the sealing of an anti-friction material, for example an oil-based liquid and/or preventing the entrance of contaminating foreign bodies.

The sealing means 45 are, for example, shaped like a wrapper, in particular like a cup-shaped casing, dimensioned to enclose the translation unit 11 and/or the lifting unit 12, 16 to maintain a correct lubrication between the sliding surfaces and prevent the entrance of foreign bodies such as, for example, dust resulting from the machining operations. Preferably, the cup-shaped casing extends laterally, so as to not interfere with the above-mentioned supporting surfaces 111 and 112.

As mentioned above, the system 100 according to the invention comprises at least two devices 50, 50' or 60, 60' positioned at edge portions of the base of the block B of stone material.

According to a first embodiment of the system 500 for movement of a block B of stone material, as shown in FIG. 1, two devices 50, 50' or 60, 60' are positioned parallel to each other and preferably equidistant with respect to a central zone of the block B in such a way as to favour the stability of the block during the movement.

Preferably, the device 50' is configured symmetrically with respect to the device 50.

In particular, each device 50 is configured in such a way as to have the translation unit 11 facing towards a central zone of the block B of stone material and the lifting unit 12 facing towards an outer edge of the block B. Advantageously, in this way, the stability of the block B during the movement is favoured further.

There is a similar configuration for an alternative embodiment of the system (not shown in the drawings), comprising a device 60' preferably configured symmetrically with respect to the device 60, as described above.

As mentioned above, the actuation means 20 20' or 22, of the movement devices described above are actuated in an alternating fashion.

FIG. 8 schematically shows some main steps of the method for movement of a block B of stone material according to the invention. In particular, the letter F indicates a direction of movement of the block B of stone material towards the cutting machine.

FIG. 8(A) shows a schematic view of a rest configuration of the movement device 50, wherein the base of the block B is in contact with the supporting surfaces 111 and 112 of the translation 11 and lifting 12 units.

FIG. 8(B) shows a first step of the movement method wherein the lifting unit 12 is actuated by means of a translation stress "I" in direction F of the slide 43 and the block B is lifted from the supporting surface 111 of the rail 33.

FIG. 8(C) shows a further step of the movement method wherein, in a raised configuration of the block B with respect to a supporting surface 111, the slide 32 of the translation unit 11 in direction "O" opposite to the forward movement direction F.

FIG. 8(D) shows yet a further step of the movement method wherein the lifting unit adopts a minimum raised configuration (detaching from the base of the block) and the block B is only supported by the supporting surface 111 of the translation unit 11.

The overall configuration of the device is such that in the above-mentioned minimum lifting configuration, the supporting surface 112 of the lifting unit 12 is at a lower height with respect to the plane at which the supporting surface 111 of the translation unit 11 lies.

In particular, the minimum lifting configuration according to the first embodiment described comprises a toothed sliding profile of the slide 43 in contact with a toothed sliding profile of the rail 33.

FIG. 8(A') shows the final step of positioning forwards (direction F) of the block by means of the movement of the slide 32 in direction F.

After executing the cut, in one or more slabs, of the part of advanced block, the block is translated again, repeating the steps of FIG. 8 in such a way as to be positioned for a further cutting operation.

Following the movement of step 8(A'), and after executing the cut, you are without further movements in step 8(A) where to restart the forward movement sequence.

Similar steps of the method according to the invention, not shown in the drawings, are to be provided for the movement device 60.

In particular, also in the case of the lifting unit 16, the supporting surface 112 will be moved from a height below the translation plane A-A to a height above to lift the block from the translation unit and again from a greater height to a lower height after having repositioned the block on the supporting surface 111.

As mentioned above, advantageously the actuation means 20, 20', 22 which actuate the movement of the translation units 11 and lifting units 16 in a device 50, 60 act in an alternating manner.

Preferably, during the machining, for example during the cutting of a slab from a block B of marble, the supporting surfaces 111 and 112 of the above-mentioned units are in contact with a base of the block of marble B in such a way as to maximise the stability of the block during machining.

Preferably, in order to translate the block B of stone material along a movement direction F, for example toward a cutting machine, the system according to the invention comprises an actuation of the translation units 11 or of the lifting units 12, 16 of the devices 50, 60 of the movement system 100 which is simultaneous and in the same direction. Alternatively, in order to rotate the block B of stone material, the system according to the invention comprises a non-simultaneous actuation, that is to say, simultaneous and in the same direction as the translation units 11 or the lifting units 12, 16 of the devices 50, 60 of the movement system 100.

Advantageously, the method according to the invention allows a gradual movement of the block of marble by means of a synchronised movement which alternates the activation of the translation unit 11 with the activation of the lifting unit 12, 16 of the devices 50, 60 of the system 100, 110.

This operating mode allows undesired lateral movements of the block B to be minimised, which could arise, for example, in a zigzag forward movement of the block.

In order to allow a precise movement of the block, for example at the cutting machine, there is a further step for so-called micro-movement, during which the actuator means can be activated independently with respect to each other in order to optimise the alignment of the cutting face with the cutting plane of the machine, for example by means of micro-rotations of the block about a direction vertical to the translation plane A-A.

This precision movement is in particular executed by activating only two of the movement devices, preferably positioned at edge ends of the base of the block B.

For this purpose, the system 100, 110 is also equipped with means for detecting the position of an end of the block, for example electronic feeler devices and/or laser position sensors.

Advantageously, therefore, by means of a synchronised movement of the block B, it is possible to optimise the precision of positioning the block B at the cutting machine.

Moreover, the characteristic alternating movement of the lifting unit 12, 16 and of the translation unit 11, allows the overall dimensions of the device and of the system according to the invention to be reduced.

The present invention is described by way of example only, without limiting the scope of application, according to its preferred embodiments, but it shall be understood that the invention may be modified and/or adapted by experts in the field without thereby departing from the scope of the inventive concept, as defined in the claims herein.

What is claimed is:

1. A movement system for moving a block of stone material, comprising:

at least two movement devices, which are positioned spaced from and parallel to each other, for supporting a portion of a base of the same block of stone material and configured for moving said portion of the base of the same block of stone material, the at least two movement devices comprising:

at least one frame shared between said at least two movement devices, said at least one frame shaped for supporting a portion of the base of the same block of stone material, said at least one frame having a substantially planar supporting surface, wherein each movement device comprises:

means for moving the same block of stone material, at least partially fixed to said at least one frame and configured for being positioned between said at least one frame and the same block of stone material, said movement means comprising at least one translation unit configured for moving a portion of the base of the same block of stone material in a translation plane, and a lifting unit configured for supporting and moving said portion of the base of the same block of stone material in a direction substantially perpendicular to said translation plane; and actuator means configured for actuating said movement means in such a way as to allow an independent actuation of each of said at least one translation unit and of said lifting unit, wherein each of said at least one translation unit comprises a rail fixed to said at least one frame and a slide slidably mounted on said rail, said slide being coupled to an actuator and said slide comprising a supporting surface for the same block, substantially coplanar with said translation plane.

2. The movement system according to claim 1, wherein said lifting unit comprises a rail fixed or which can be fixed to said at least one frame and a slide slidably connected to said rail.

3. The movement system according to claim 2, wherein said slide comprises a sliding surface with respect to said rail, said sliding surface having at least one sliding portion inclined with respect to said translation plane.

4. The movement system according to claim 3, wherein each rail comprises a further sliding surface shaped for being coupled with said sliding surface.

5. The movement system according to claim 3, wherein said actuator means comprise a linear actuator configured for actuating a sliding of said slide with respect to the respective rail in a direction substantially parallel to said translation plane.

6. The movement system according to claim 2, wherein said actuator means comprise a linear actuator configured for actuating a sliding of the slide with respect to the respective rail in a direction substantially parallel to said translation plane.

7. The movement system according to claim 1, wherein said lifting unit comprises at least two spacer elements fixed to said at least one frame shaped for spacing the same block of stone material from the at least one frame.

8. The movement system according to claim 7, wherein said lifting unit comprises a supporting rail interposed between said at least two spacer elements and the same block of stone material.

9. The movement system according to claim 7, wherein said actuator means comprise another linear actuator positioned or which can be positioned at each of said spacer elements, said other linear actuator being configured for actuating a translation of the same block of stone material in a direction substantially perpendicular to said translation plane.

10. The movement system according to claim 1, wherein said actuator means comprise a linear actuator configured for actuating a sliding of a slide with respect to a respective rail in a direction substantially parallel to said translation plane.

11. The movement system according to claim 1, wherein said actuator means comprise another linear actuator configured for actuating a translation of said slide with respect to said supporting surface of said at least one frame in a direction substantially parallel to said translation plane, said translation resulting in a movement of the same block of stone material in a direction substantially perpendicular to said translation plane.

12. The movement system according to claim 1, wherein each movement device comprises a frame shaped for supporting the portion of the base of the same block of stone material, said frame having a substantially planar supporting surface.

13. A movement method for moving a block of stone material, comprising the steps of:

positioning the same block of stone material on a substantially planar supporting surface of at least two movement devices of a movement system according to claim 1, actuating a movement of the same block of stone material towards a predetermined direction, wherein said movement comprises a translation of the same block of stone material with respect to said supporting surface, on a translation plane, and a lifting of a base of the same block in a direction substantially vertical to the translation plane, said translation and said lifting occurring in an alternating manner in such a way as to allow a progressive movement of the same block with respect to the supporting surface.

14. The movement method according to claim 13, wherein said movement comprises a rotation of the same block of stone material on said translation plane.

* * * * *